United States Patent [19]
Hansen

[11] 4,012,072
[45] Mar. 15, 1977

[54] FLEXING MULTI-FIRMNESS SEAT COVER

[76] Inventor: Leif A. Hansen, 2000 Broadway, San Francisco, Calif. 94123

[22] Filed: Jan. 19, 1976

[21] Appl. No.: 650,568

[52] U.S. Cl. ............................... 297/219; 297/203; 297/214; 297/453

[51] Int. Cl.² ....................................... A47C 27/00

[58] Field of Search ............... 5/338, 341; 297/195, 297/202, 214, 218, 219, 453

[56] References Cited

UNITED STATES PATENTS

| 1,271,375 | 7/1918 | Saunders | 297/214 X |
| 1,742,186 | 1/1930 | Claus | 5/341 UX |
| 3,148,389 | 9/1964 | Lustig | 5/341 X |

*Primary Examiner*—James C. Mitchell
*Attorney, Agent, or Firm*—Warren J. Krauss

[57] ABSTRACT

A cover for a bicycle seat which flexes with movements of the bicycle rider's legs to reduce or eliminate relative movement between the cover and the leg. The cover includes recess means adapted to accept a plurality of different padding inserts to produce a composite seat of any desired firmness and flexibility. The cover has a plurality of substantially longitudinally disposed grooves and raised portions which serve the dual functions of increasing air circulation between the seat cover and body of the rider and of providing an accordian-like movement with the up and down movements of the rider's legs to substantially reduce or eliminate relative movement between the seat cover and the legs of the rider.

9 Claims, 10 Drawing Figures

FLEXING MULTI-FIRMNESS SEAT COVER

BACKGROUND OF THE INVENTION

The present invention relates to a cover for the seat of a bicycle or other type of vehicle, or for an animal saddle wherein repetitive movements of the rider's legs may be expected. In particular, the invention relates to a cover adapted to be fitted over the seat or saddle of a bicycle to provide a selectively variable degree of cushioning and stiffness in the seat, good air circulation between the seat and the body of the rider, and the drastic reduction or elimination of chafing and heat production due to relative movement between the seat cover and the legs of the rider.

Most modern multi-speed racing or touring bicycles are provided with hard leather or composition material saddles having relatively inflexible configurations and smooth, hard surfaces. Such saddles are intended to "break in" after prolonged use such as to conform to the basic shape of the rider utilizing them. In practice, however, such saddles in fact do not sufficiently adjust and soften so as to become comfortable in use. Additionally, during a ride of sustained duration, such saddles permit the sliding or chafing of the legs of the rider against the saddle material to generate heat and produce wear on the clothing of the rider or, in some cases, burning or other uncomfortable irritations of the legs of the rider. Also, such commonly used saddles conform closely to configuration of the body and form therewith an effective seal against the circulation of air between the rider's body and the saddle so as to prevent the evaporation of moisture and consequent cooling of the rider.

Some attempts have been made in the prior art to address, at least individually, some of these problems. Examples of such prior art attempts are found in U.S. Pat. Nos. 1,271,375 to Saunders; 707,592 to Hughes; 2,149,247 to Mesinger; and 3,519,308 to Kasman et al. None of such patents, however, show inventions which are intended to simultaneously solve various of the noted problems while at the same time provide an inexpensively fabricatable, extremely efficient and functional seat cover having a decidedly attractive appearance.

The present invention simultaneously eliminates all of the aforementioned problems by providing an adjustable seat cover having means for producing air circulation between the body of the rider and the seat cover, readily removable and installable padding insert means for the cover to produce any desired degree of firmness and flexibility, and means for eliminating relative movement between the legs of the rider and the seat cover to eliminate friction wear and irritation of the legs of the rider.

SUMMARY AND OBJECTS OF THE INVENTION

The instant invention comprises a seat cover for a bicycle saddle or the like which is removably mountable upon such saddle by convenient fastening means. The seat cover is provided with dual function, groove and raised portion means which serve to promote air circulation between the body of the rider or operator and the cover while also serving to eliminate relative movement between the seat cover and the body of the operator with consequent elimination of friction wear and irritation. The seat cover is provided with recess means for accepting any of a plurality of padded inserts of various thicknesses and firmnesses to provide a composite seat suitable for the demands of many different riders and riding situations.

A primary object of the present invention is to provide a seat cover for a bicycle saddle or the like having substantially longitudinally disposed grooves and raised portion means which move in accordian-like fashion with the legs of the rider to eliminate relative movement and friction wear between such legs and seat cover.

Another object of the present invention is to provide a seat cover for bicycle saddles or the like having recess means for the acceptance of fitted insert pads of various thicknesses and firmnesses, as desired.

A further object of the present invention is to provide a seat cover for the saddle of a bicycle or the like having means to promote air circulation between the body of the rider and the seat cover.

Other objects and advantages of the present invention will become apparent from the following drawings and description.

DETAILED DESCRIPTION

Figure 1:
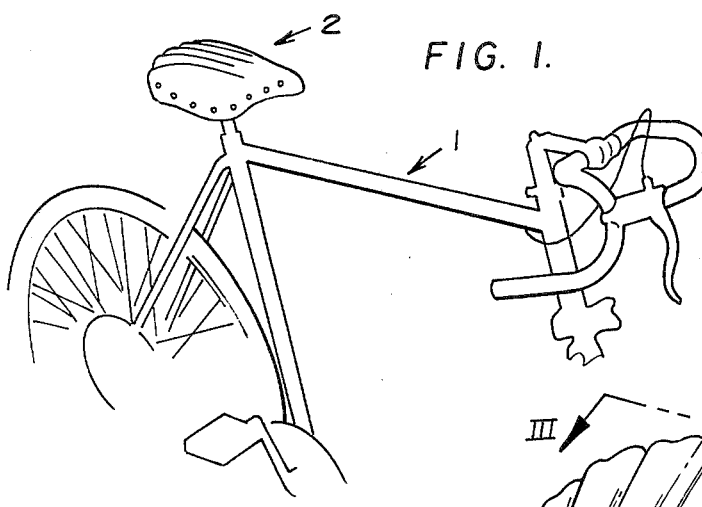
FIG. 1 is an isometric view of a bicycle equipped with the novel seat cover of the present invention.

With reference to the drawings, the inventive seat cover may be readily appreciated within its operative context. For the purpose of illustration only, a racing bicycle is shown in FIG. 1. However, it should be noted that the structural principles of the present seat cover are equally applicable to many types of seats for many different vehicles, especially where substantial relative movement between the body and the user of the seat cover occurs. Appropriate uses for the instant seat cover might be found, for example, for horseback riding saddles and for the seats of motor vehicles of all types.

Figure 3:
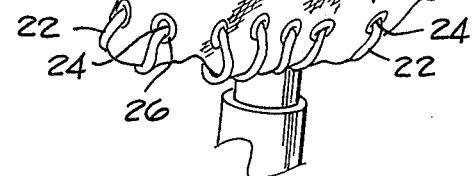
FIG. 3 is a partial sectional view taken along the line III—III of FIG. 2.

A bicycle, shown generally at 1, is provided with a conventional saddle which is covered by the present seat cover 2. With reference to FIG. 3, a conventional hard leather saddle for the bicycle is shown at 4. The instant cover for such saddle has an external surface 6 which may be fabricated from canvas, soft leather or other suitably pliant, long wearing material. Preferably, the outside surface 6 is treated for water repellency and stain resistance.

Figure 2:
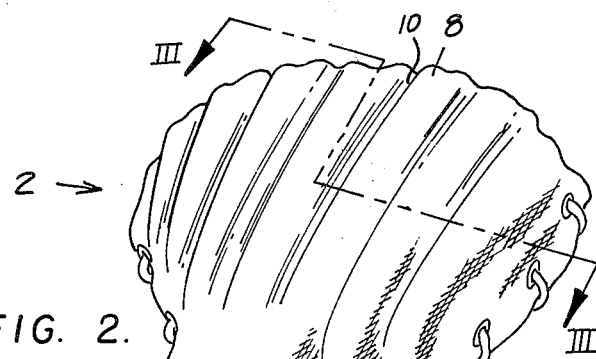
FIG. 2 is an enlarged external isometric view of one embodiment of the present seat cover.

As shown in FIGS. 1–3. the surface 6 is formed into a plurality of substantially longitudinally extending raised portions 8 and grooves 10 which form circulating air passages beneath the body of the rider. The grooves and raised portions are formed by means of sewing or gluing down the bases of the grooves against a backing material 12 so as to form a plurality of discrete chambers for receiving finger-like inserts or batts 13 of relatively firm material such as plastic foam rubber which provide structural support for the raised portions 8 when exposed to the body weight of the rider.

Figure 5:
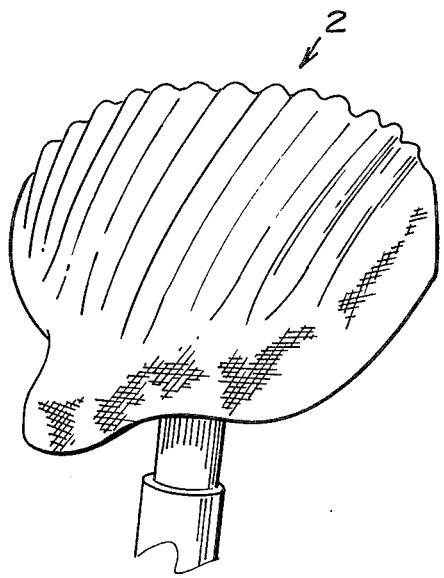
FIG. 5 shows a seat cover embodying an alternate means for fastening the cover to the bicycle saddle.

As shown most clearly in FIGS. 2 and 5, the grooves and raised portions extend down around the sides of the cover and conform closely to the shape of the underlying seat or saddle. With this configuration, upon engagement of the surface 6 by the rider's leg, the grooves and raised portions compress and expand and provide a "rolling" movement matching that of the leg of the rider. This rolling capacity virtually eliminates or drastically reduces the usually expected relative movement between the surface 6 and the rider's leg to completely eliminate chafing or frictional wear.

Figure 10:
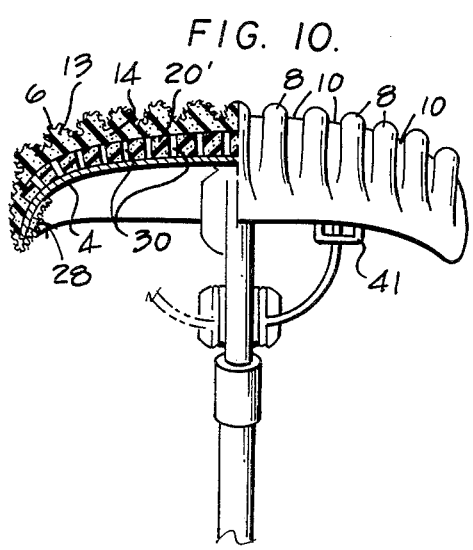
FIG. 10 is a view similar to FIG. 3 but showing an alternate embodiment.

The chambers for containing the finger-like batts 13 may be closed, as shown in FIG. 3, or open, and the batts 13 may be integrally formed with a foam backing material 14, as shown in FIG. 10.

Figure 4:
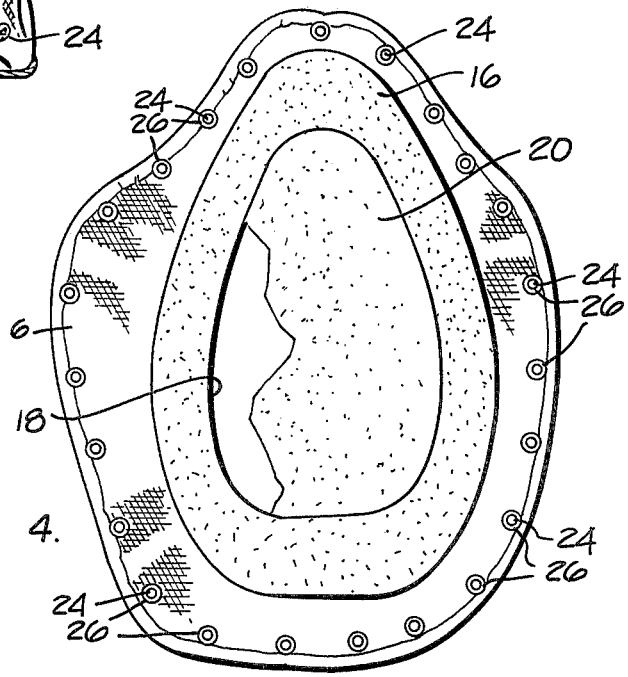
FIG. 4 is an expanded underview of the seat cover of FIG. 2, removed from the bicycle saddle, with a partially cut-away view of one embodiment of the padding insert.

As best appreciated with concurrent reference to FIGS. 3 and 4, the underside of the cover 2 is provided with a formed ring-like padded member 16 of plastic foam, rubber or the like. This member 16 includes a shaped aperture or recess 18 adapted to receive a padding insert 20. The insert 20 conforms to the shape of the recess 18 and may be fabricated from the same material as the member 16 or from another type of material depending upon the desired firmness and riding characteristics. Because of the thickness and type of material used for the insert 20, it may be readily varied and selected, and a wide variety of inserts may be utilized. The user of the present seat cover may effectively create a composite seat having an infinite variety of different characteristics. For example, a lightweight rider may select a thin but firm padding insert to give him the desired "feel" of the basic saddle, whereas a heavier rider, more concerned with comfort than with function, might select a thick, more supple padding insert 20.

The cover illustrated in FIGS. 2 and 4 is conveniently attached to the bicycle saddle by means of a lace 22 or the like threaded through a plurality of eyelets or apertures 24 suitably provided with reinforcing grommets 26 of brass, plastic or the like. In FIGS. 5 and 10, an alternate fastening arrangement for the seat cover is shown. In such embodiment, the eyelets and lacing are replaced by a strong elastic band 28 sewn or glued into a cover structure to provide slip-on convenience.

Figure 6:
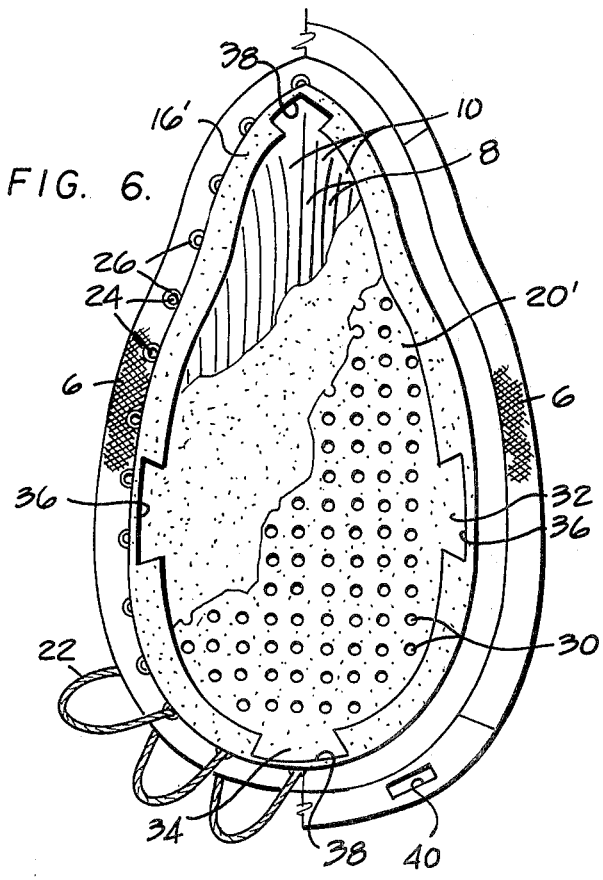
FIG. 6 is an underview of the instant cover partially cut-away to show an alternate insert and insert attachment system.

Also shown in FIGS. 6 and 10 is an alternative structure for a multi-thickness padding insert 20, and for the receiving structure therefor. In this embodiment, the padding insert 20' is conveniently provided with a plurality of air circulation perforations 30, for increased heat dissipation, and with a plurality of keys 32, 34 adapted to be received within correspondingly-shaped keyways 36, 38 in the insert retaining structure 16'. The keys and keyways effectively create a plurality of dove-tail joints for preventing axial lateral movements of the inserts relative to the seat cover while permitting facile removal and interchangeability of inserts. The cover is also provided with an aperture 40 for receiving a saddle bag fitting 41 or like part attached to the saddle 4.

Figure 7:
FIGS. 7–9 show alternate arrangements for the application of backing material to the seat cover.
Figure 8:
Figure 9:

FIGS. 7, 8 and 9 show, respectively, single, double and triple layer configurations for applying padding members to the underside of the seat cover of the present invention. In FIG. 7, a single layer of padding 16', having a plurality or airflow perforations, is glued or sewn to the upper canvas surface 6, as shown in FIG. 6. In FIGS. 8 and 9, however, double and triple laminated layers of foam or rubber could be substituted for the single layer 16'. In FIG. 9, solid and perforated layers are combined.

It may be readily seen that the present invention provides an efficient and readily usable seat cover system in which rider comfort is a prime consideration. The instant seat cover is sporty in appearance, provides improved air circulation beneath the body of the rider, provides a cessation of relative movement between the legs of the rider and the seat cover to eliminate friction wear and irritation, and provides padded comfort for the rider which is readily adjustable and determinable by the rider. All such benefits are derived at relatively low cost to the user.

Although the invention has been described and illustrated with reference to particular preferred embodiments, it will be apparent to those skilled in the art that many variations and modifications are possible within the spirit of the inventive concepts. For example, it is apparent that the readily changeable padding insert concept could be utilized without being combined with a seat cover having rolling raised portions and grooves. A saddle could be adapted to receive, as attachments, non-integrated pad elements of various firmnesses and thicknesses. No limitation is intended with respect to such variations and modifications except those implicit in the scope of the appended claims.

I claim:

1. Cover means for covering a seat of established construction, said cover means comprising; exterior surface material means for directly engaging a user of said seat, said external surface material means being formed to include a plurality of adjacently extending raised means and groove means for providing circulation of air between said user and said exterior surface means and for flexing compressively and expansively with movements of said user to substantially reduce relative movements and friction wear between said user and said exterior surface material means, said adjacently extending raised means being separated one from another by said groove means and having substantial height with respect to said groove means, said raised means and groove means functioning to reduce relative movements between said user and said surface material means by rolling in fixed contact with said user and moving together and apart in accordian-like fashion, said cover means including fastening means for rapidly and readily removably securing said cover means to said seat.

2. The invention of claim 1 wherein said fastening means include lace means and a plurality of lace means receiving apertures transpiercing said exterior surface material means.

3. The invention of claims 1 wherein said fastening means include one-piece elastic band means attached to a portion of said cover means for firmly urging said cover means into engagement with said seat.

4. The invention of claim 1 wherein said cover means further include replaceable insert means and retainer means therefor for providing selectively variable firmness and thickness characteristics of said cover means for said user.

5. The invention of claim 4 wherein said retainer means include a padded member of flexible material having a recess therein for receiving said insert means, said insert means including a plurality of interchangeable inserts of varying thickness and firmness each closely conforming to the dimensions of said recess in said padded member said recess including at least one keyway portion and said insert means including at least one key portion shaped to correspond with said at least one keyway to prevent relative movements between said insert means and said recess.

6. The invention of claim 5 wherein said padded member is firmly attached to an inner portion of said exterior surface material means opposite to an outer portion of said exterior surface material means which engages said user, and wherein said inner portion directly engages said seat, said padded member including a plurality of raised portions which form said adjacently extending raised means of said cover means.

7. The invention of claim 5 wherein said padded member is fixedly attached to said exterior surface material means and wherein said padded member co-operates with said groove means of said exterior surface material means to form a plurality of extending chambers in said cover means, each of said plurality of chambers containing a batt of flexible material for forming said raised means in said cover means.

8. The invention of claim 4 wherein said insert means include a one-piece insert member having air circulation perforations therein.

9. The invention of claim 4 wherein said insert means include an insert member formed of laminar sheets of flexible material, at least one sheet of which is perforated for air circulation.

* * * * *